United States Patent

Capelle et al.

Patent Number: 5,262,111
Date of Patent: Nov. 16, 1993

[54] PROCESS FOR THE CONTINUOUS PRODUCTION OF RUBBER COMPOUNDS IN A TWIN-SCREW EXTRUDER

[75] Inventors: Gerd Capelle, Langenhagen; Holger Schaarschmidt; Dieter Mayer, both of Hanover; Markus-Michael Wolff, Burgdorf, all of Fed. Rep. of Germany

[73] Assignee: Hermann Berstorff Maschinenbau GmbH, Hanover, Fed. Rep. of Germany

[21] Appl. No.: 942,404

[22] Filed: Sep. 9, 1992

[30] Foreign Application Priority Data

Sep. 12, 1991 [DE] Fed. Rep. of Germany ....... 4130314

[51] Int. Cl.$^5$ .............................................. B29C 47/40
[52] U.S. Cl. .............................. 264/211.23; 264/349; 425/204
[58] Field of Search ............... 264/211.23, 349, 176.1, 264/347, 105; 425/204, 208, 207

[56] References Cited

U.S. PATENT DOCUMENTS

| | | | |
|---|---|---|---|
| 3,070,836 | 1/1963 | De Haven et al. | 425/204 |
| 3,904,719 | 9/1975 | Fritsch | 425/204 |
| 4,649,005 | 3/1987 | Kobayashi et al. | 425/204 |
| 4,839,114 | 6/1989 | Delphin et al. | 264/105 |
| 4,897,236 | 1/1990 | Rabiger et al. | 425/204 |
| 5,158,725 | 10/1992 | Handa et al. | 264/211.23 |

FOREIGN PATENT DOCUMENTS

| | | |
|---|---|---|
| 3729236 | 6/1988 | Fed. Rep. of Germany ...... 425/204 |
| 3729237 | 6/1988 | Fed. Rep. of Germany . |
| 2574803 | 6/1986 | France ................. 264/105 |

Primary Examiner—Jeffery Thurlow
Attorney, Agent, or Firm—Foley & Lardner

[57] ABSTRACT

A process for the continuous production of a rubber compound in a twin-screw extruder is disclosed that improves the dispersion of carbon black in the extrudate while reducing the specific energy requirements of the extrudate. Rubber is fed into the extruder together with a processing aid and masticated up to a temperature of 120° C. to 180° C. Subsequently, a first part of carbon black representing preferably 40% to 80% of the whole quantity of carbon black is fed into the heated extrudate. Afterwards, plasticizing oil is added to the extrudate before the second remaining carbon black part is fed and incorporated into the extrudate at a temperature of 120° C. to 180° C. The whole compound is then cooled, a crosslinking agent is added, and the compound is homogenized and extruded.

14 Claims, 1 Drawing Sheet

PROCESS FOR THE CONTINUOUS PRODUCTION OF RUBBER COMPOUNDS IN A TWIN-SCREEN EXTRUDER

BACKGROUND OF THE INVENTION

1. Field of the Invention

The present invention relates to a process for the continuous production of rubber compounds with a twin-screw extruder.

2. Description of Related Art

DE 37 29 237 discloses a process in which rubber, together with fillers, oils, auxiliary substances, and crosslinking agents, is continuously converted into a rubber compound in a twin-screw extruder. Crushed rubber is fed into the extruder together with a processing aid, and masticated along a first screw section. At the end of this first screw section, the entire amount of filler, including carbon black and plasticizing oils, as well as other auxiliary substances and crosslinking agents well known in the art, are introduced into the extrudate, which has a temperature of approximately 60° C. to 80° C. in this zone. These components are mixed in the second extruder section with the rubber before the resulting compound is homogenized in a third extruder section.

Mixing carried out according to this process is satisfactory although a comparatively lengthy homogenizing phase was necessary. A high specific energy requirement was necessary, however, for production of the rubber compound.

SUMMARY OF THE INVENTION

It is therefore an object of the present invention to provide a process for incorporating carbon black into a rubber compound in a twin-screw extruder that has a low specific energy requirement.

These and other objects according to the invention are provided by a process for the continuous production of rubber compounds in a twin-screw extruder, comprising the steps of feeding rubber and a processing aid into a twin-screw extruder; masticating and heating the rubber in a processing section of the extruder; feeding and incorporating a first part of carbon black into the masticated and heated rubber; injecting and incorporating plasticizing oils into the rubber; feeding and incorporating a second part of carbon black into the rubber; cooling the rubber; adding a crosslinking agent and incorporating it into the rubber; and homogenizing and extruding the extrudate.

In a preferred embodiment, the rubber is heated to a temperature between about 120° C. and 180° C. in the processing section of the extruder. It is preferred that the temperature of the rubber during addition of the first and second parts of carbon black be between about 120° C. and 180° C., preferably between about 150° C. and 180° C., and is cooled to between about 100° C. and 120° C. before addition of the crosslinking agent. It is preferred that the first part of the carbon black represent at least 10% of the entire amount of carbon black to be added to the extrudate.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The single drawing comprises a diagram showing the locations along the length of a twin-screw extruder at which components used to produce rubber are introduced according to the invention. The locations are expressed in multiples of the screw diameter (D).

DETAILED DESCRIPTION OF THE PREFERRED EMBODIMENTS

Figure 1:
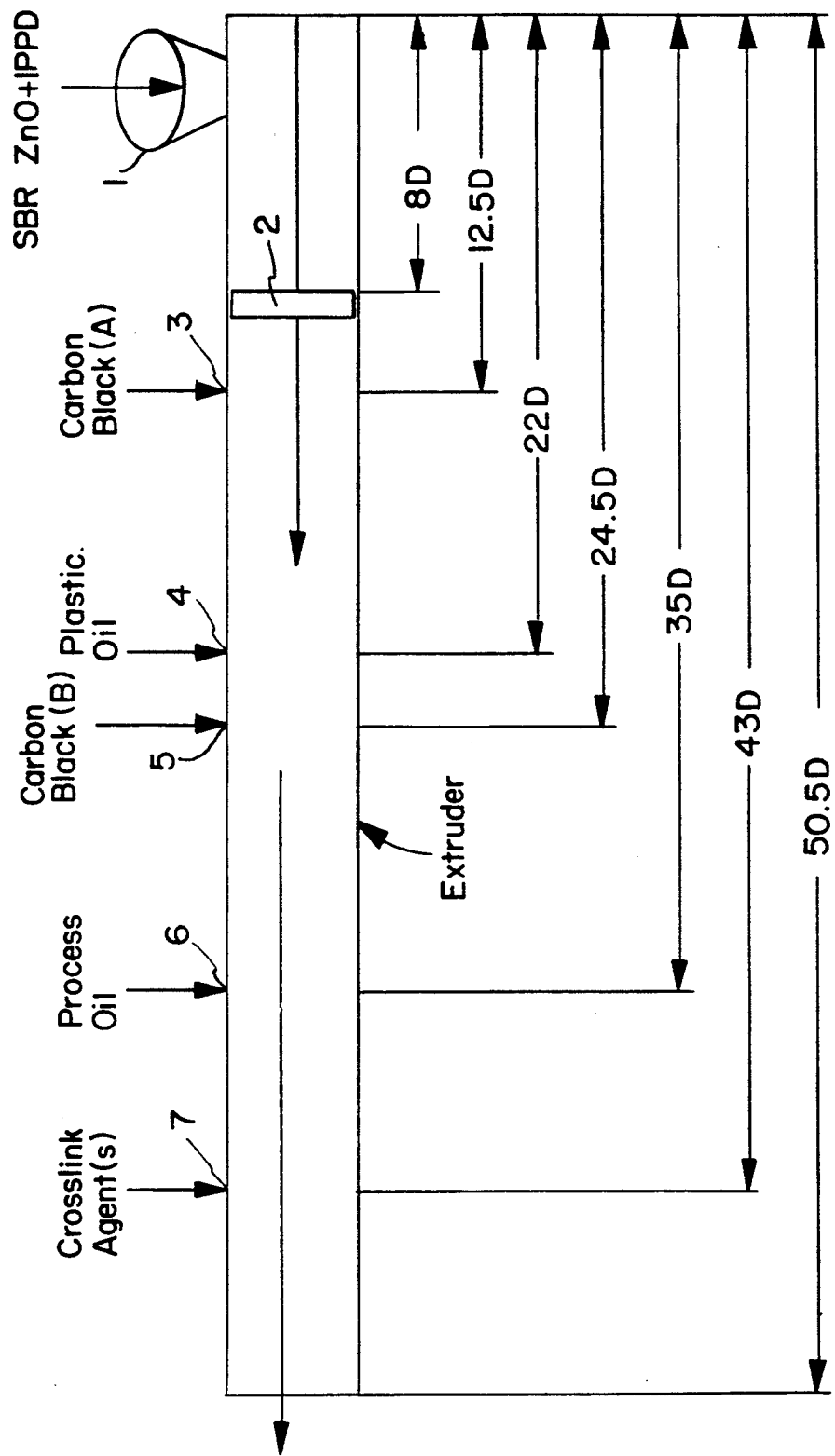

It has surprisingly been discovered according to the present invention that a process having a reduced specific energy requirement results when carbon black is added to a rubber mixture at more than one location along the length of an extruder.

The drawing shows a preferred embodiment with respect to locations for additions of components in a rubber-making process according to the present invention. In a first step, rubber and a processing aid or aids are dosed into feed hopper 1 of a twin-screw extruder. The rubber may be, e.g., styrene butadiene rubber (SBR), while a typical processing aid is zinc oxide (ZnO), perhaps combined with an antioxidant (IPPD). The rubber is masticated and heated.

A continuously adjustable throttle unit schematically shown at 2 is arranged in the processing section of the extruder and provides for both an adjustable pressure increase and a quick rise in the extrudate temperature. Throttles of this type are well known in the industry, and the throttle is accordingly shown only schematically. One source for a throttle of suitable, known type is Hermann Berstorff Maschinenbau GmbH, Hannover, Germany, the assignee of the present application.

By means of the throttle 2, the rubber is retained in the processing section until the desired pressure and temperature levels are attained. The rubber generally is heated to about 120° C. to 180° C., preferably to about 150° C. to 180° C. for most rubber compounds.

A first part (A) of carbon black is introduced into the masticated and heated rubber downstream of the extruder throttle, at point 3. In a preferred embodiment, the first part (A) of the carbon black is about 10% to 80% of the total amount of carbon black to be added to the extrudate, preferably about 40% to 80%.

Plasticizing oils are then injected and incorporated into the compound downstream of the first carbon black introduction point, at point 4. Any known plasticizing oils can be used. The remaining part (B) of the carbon black is fed and incorporated into the compound at point 5. The rubber compound temperature is still about 120° C. to 180° C., preferably about 150° C. to 180° C., during the second addition. Additional processing oil may be added at point 6, after the second carbon black introduction point. The compound is then cooled to about 100° C. to 120° C. and a crosslinking agent or agents are added to the compound at point 7. Any of the crosslinking agents that are well-known in the art may be used. The extrudate is then homogenized and extruded.

The process according to the invention is an improved process for continuous production of rubber compounds with twin-screw extruders. By dividing the total amount of carbon black to be added into two parts, it is more easily incorporated into the extrudate. In addition, the incorporation of the carbon black parts (A) and (B) into the rubber compound when it is at a temperature between about 120° C. and 180° C., preferably between about 150° C. and 180° C., leads to an unexpectedly excellent degree of dispersion of the carbon black into the compound.

The present invention can better be understood with reference to the following example, which is not limiting.

EXAMPLE

In a twin screw extruder having a screw diameter (D) of 90 mm and a screw length of 50.5 D, the following ingredients were added at the input openings shown in the drawing.

| Ingredient | Wt. % |
|---|---|
| Rubber SBR 1712 | 58.0 |
| Carbon black N 339 | 31.6 |
| Aromatic Oil | 6.3 |
| Antioxidants IPPD | 0.6 |
| Stearic acid | 0.8 |
| Zinc Oxide | 1.3 |
| Sulfur | 0.6 |
| Accelerator VDM/C | 0.5 |
| Accelerator VDIC | 0.3 |

Output 500 Kg/h

The following components are dosed into feed hopper 1 of the twin screw extruder:

| | |
|---|---|
| Rubber SBR 1712 | 290 Kg/h |
| Zinc Oxide | 6.5 Kg/h |
| Antioxidant | 3 Kg/h |

By means of throttle unit 2, a back pressure is adjusted in the extruder to plasticize and heat the components to about 180° C. To this plasticized compound, 80 Kg/h of carbon black are dosed at opening 3 at 12.5 D. Further downstream, at opening 4 at 22 D, 25.5 Kg/h of an aromatic oil is injected. The oil is mixed into the compound.

A second portion (B) of carbon black is added at opening 5 at 24.5 D. The feed rate of the second portion of carbon black is 78 Kg/h. At opening 6 at 35 D, 6 Kg/h of the aromatic oil are dosed. The compound is very homogeneous when the last components are added at opening 7 at 43 D. The last ingredients consist of:

| | |
|---|---|
| Stearic Acid | 4 Kg/h |
| Sulfur | 3 Kg/h |
| Accelerator VDM/C | 2.5 Kg/h |
| Accelerator VDIC | 1.5 Kg/h |

After leaving the extruder the compound is of an excellent homogeneous quality, as determined by rheological and optical measurements. The dispersion of carbon black in the compound was better than in the compound processed by known processes.

What is claimed is:

1. A process for the continuous production of rubber compounds in a twin-screw extruder, comprising the steps of:

feeding rubber and a processing aid into a twin-screw extruder;

masticating and heating the rubber in a processing section of the extruder;

feeding and incorporating a first part of carbon black into the masticated and heated rubber;

injecting and incorporating plasticizing oils into the rubber;

feeding and incorporating a second, remaining part of carbon black into the rubber at a location spaced from the feeding of said first part of carbon black into the rubber;

cooling the rubber;

adding a crosslinking agent and incorporating it into the rubber; and homogenizing and extruding the extrudate.

2. A process for the continuous production of rubber compounds in a twin-screw extruder as recited in claim 1, wherein the rubber is heated to a temperature between about 120° C. and 180° C. in the processing section of the extruder.

3. A process for the continuous production of rubber compounds in a twin-screw extruder as recited in claim 2, wherein the temperature of the rubber during addition of the first and second parts of carbon black is between about 120° C. and 180° C.

4. A process for the continuous production of rubber compounds in a twin-screw extruder as recited in claim 3, wherein during said step of cooling the rubber, the temperature of the rubber is cooled to between about 100° C. and 120° C.

5. A process for the continuous production of rubber compounds in a twin-screw extruder as recited in claim 1, wherein the rubber is heated to a temperature between about 150° C. and 180° C. in the processing section of the extruder.

6. A process for the continuous production of rubber compounds in a twin-screw extruder as recited in claim 5, wherein the temperature of the rubber during addition of the first and second parts of carbon black is between about 150° C. and 180° C.

7. A process for the continuous production of rubber compounds in a twin-screw extruder as recited in claim 6, wherein during the step of cooling the rubber, the temperature of the rubber is cooled to between about 100° C. and 120° C.

8. A process as recited in claim 1, wherein the processing aid comprises zinc oxide.

9. A process as recited in claim 1, wherein the first part of the carbon black represents at least 10% of the entire amount of carbon black to be added to the extrudate.

10. A process as recited in claim 4, wherein the first part of the carbon black represents at least 10% of the entire amount of carbon black to be added to the extrudate.

11. A process as recited in claim 7, wherein the first part of the carbon black represents at least 10% of the entire amount of carbon black to be added to the extrudate.

12. A process as recited in claim 1, wherein the first part of the carbon black represents at least 40% of the entire amount of carbon black to be added to the extrudate.

13. A process as recited in claim 4, wherein the first part of the carbon black represents at least 40% of the entire amount of carbon black to be added to the extrudate.

14. A process as recited in claim 7, wherein the first part of the carbon black represents at least 40% of the entire amount of carbon black to be added to the extrudate.

* * * * *